United States Patent
Ihara et al.

(10) Patent No.: US 8,013,084 B2
(45) Date of Patent: Sep. 6, 2011

(54) MANUFACTURING METHOD AND APPARATUS OF OPTICAL MATERIAL

(75) Inventors: Masaki Ihara, Minowa-machi (JP); Toru Saito, Minowa-machi (JP); Akinori Yamamoto, Minowa-Machi (JP)

(73) Assignee: Seiko Epson Corporation, Tokyo (JP)

( * ) Notice: Subject to any disclaimer, the term of this patent is extended or adjusted under 35 U.S.C. 154(b) by 314 days.

(21) Appl. No.: 12/336,934

(22) Filed: Dec. 17, 2008

(65) Prior Publication Data

US 2009/0156781 A1 Jun. 18, 2009

(30) Foreign Application Priority Data

Dec. 17, 2007 (JP) ................................. 2007-324530

(51) Int. Cl.
- *C08G 75/04* (2006.01)
- *C08G 75/08* (2006.01)
- *C08L 81/02* (2006.01)

(52) U.S. Cl. ........................................ 526/89; 524/742

(58) Field of Classification Search .................... 526/89; 524/742

See application file for complete search history.

(56) References Cited

U.S. PATENT DOCUMENTS

| | | | |
|---|---|---|---|
| 2004/0254258 A1 | 12/2004 | Horikoshi et al. | |
| 2007/0149639 A1 | 6/2007 | Horikoshi et al. | |
| 2009/0018308 A1* | 1/2009 | Kamura et al. | 528/375 |
| 2009/0076208 A1 | 3/2009 | Usugi et al. | |

FOREIGN PATENT DOCUMENTS

| | | |
|---|---|---|
| EP | 2006319 A2 | 12/2008 |
| JP | 07126304 A | 5/1995 |
| JP | 2003176305 A | 6/2003 |
| JP | 2004-137481 | 5/2004 |

(Continued)

OTHER PUBLICATIONS

Ino et al., "Compositions for optical materials and substrates of eyeglass lenses using them" retrieved from STN, No. 2004: 963187, pp. 1-4.

(Continued)

*Primary Examiner* — Kelechi Egwim

(74) *Attorney, Agent, or Firm* — DLA Piper LLP (US)

(57) ABSTRACT

A manufacturing method of an optical material, the method including: blending an inorganic compound (a) containing at least one of a sulfur atom and a selenium atom and a compound (b) represented by a following formula (1) in a tank, the compound (a) and the compound (b) being blended at a ratio of 1 mass % or more and 50 mass % or less of the compound (a) and 50 mass % or more and 99 mass % or less of the compound (b) relative to a total mass of a mixture of the compound (a) and the compound (b); mixing a compound (c) containing at least one thiol (SH) group; preliminarily polymerizing the compounds; cooling the compounds; and deaerating the compounds, in which a viscosity of the composition stored in the tank is controlled during at least one of the preliminarily polymerizing, the cooling and the deaerating

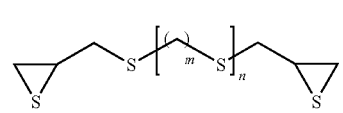

(1)

(m represents an integer of 0 to 4, and n represents an integer of 0 to 2).

2 Claims, 2 Drawing Sheets

FOREIGN PATENT DOCUMENTS

| | | | |
|---|---|---|---|
| JP | 2004137481 | A | 5/2004 |
| JP | 2004315556 | A | 11/2004 |
| JP | 2005298742 | A | 10/2005 |
| JP | 2006-348285 | | 12/2006 |
| JP | 2007002067 | A | 1/2007 |
| JP | 2007238796 | A | 9/2007 |
| WO | 2006123731 | A1 | 11/2006 |
| WO | WO 2006123731 | A1 * | 11/2006 |
| WO | 2007099702 | A1 | 9/2007 |

OTHER PUBLICATIONS

Kondo et al., "Viscosity method compound monomer resin optical medium plastic lens film react preset amount sulphur thiol group"

Database WPI Week 200825, Thomson Scientific, GB; AN 2008-D40153, pp. 1-2.

Basker et al., "Viscometers" Wiley Encyclopedia of Electrical and Electronics Engineering, pp. 232-245, Dec. 27, 1999.

Anonymous, "FVM-80A Series Viscosimeters (In-line type)" Sekonic Corporation, 2010, retrieved from internet http://www.cbc-materials.com/e/products/index3.html.

Richards et al., "Measurement and Control of Polymerization Reactors" Handbook of Polymer Reaction Engineering, pp. 595-678, Mar. 26, 2008, retrieved from the internet http://onlinelibrary.wiley.com/doi/10.1002/9783527619870.ch12/pdf>.

* cited by examiner

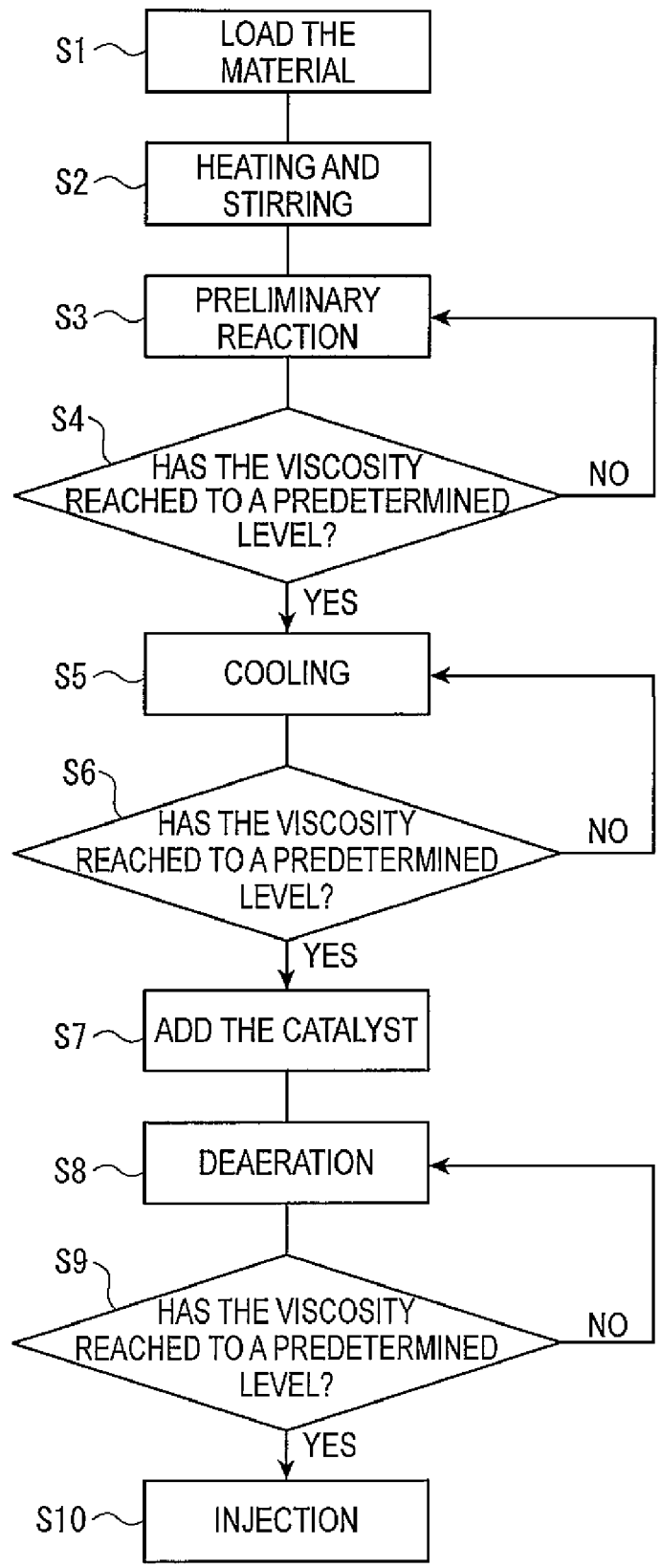

MANUFACTURING METHOD AND APPARATUS OF OPTICAL MATERIAL

The entire disclosure of Japanese Patent Application No. 2007-324530, filed Dec. 17, 2007 is expressly incorporated by reference herein.

BACKGROUND

1. Technical Field

The present invention relates to a manufacturing method and a manufacturing apparatus of optical material for optical goods such as a plastic lens.

2. Related Art

Traditionally, optical goods such as plastic lenses are manufactured by mixing a plurality of materials, injecting the mixture into a mold and polymerizing the materials within the mold. Since the polymerization is not sufficiently conducted according to the type of used materials, it is considered effective to conduct a preliminary reaction step for preliminarily reacting the materials before being injected into the mold.

In order to manufacture optical goods of a constant quality, the progress of the preliminary reaction is preferably controlled.

For instance, Document 1 (JP-A-2004-137481) discloses a preliminary reaction and deaerating processing that are conducted before a reacting composition is injected into a mold, where the progress of the reaction is detected by measuring a refractive index of a reacting composition. Specifically, an in-line refractometer is attached to a blend tank in which the preliminary reaction and the deaerating processing are conducted and a detector portion of the refractometer is always immersed in the reacting composition, so that the refractive index of the reacting composition is measured and monitored to control the progress of the blending operation.

In a manufacturing process of optical goods such as plastic lenses, the injecting operation of monomer (reacting composition) has come to be automated, where it is difficult to inject the monomer into the mold if the viscosity of the monomer is lower than a predetermined value. Manual injection allows injection of more viscous monomers than the monomers that can be injected by automated injection. However, it still is difficult to be injected into the mold when the viscosity of the monomer is lower than a predetermined value.

According to the progress management by measuring the refractive index as disclosed in the Document 1, the variation in quality of the final lenses can be restrained to a certain degree. However, since the viscosity is not recognized, it is likely that some trouble occurs when the monomer is injected into the mold. In other words, the progress management based on refractive index is not always effective for stable production in an actual mass production process.

SUMMARY

An object of the invention is to provide a manufacturing method and apparatus for an optical material that can control a progress of a preliminary reaction, cooling and deaerating processes and is adapted for mass production in a highly reproducible manner.

A manufacturing method of an optical material according to an aspect of the invention includes: blending an inorganic compound (a) containing at least one of a sulfur atom and a selenium atom and a compound (b) represented by a following formula (1) in a tank, the compound (a) and the compound (b) being blended at a ratio of 1 mass % or more and 50 mass % or less of the compound (a) and 50 mass % or more and 99 mass % or less of the compound (b) relative to a total mass of a mixture of the compound (a) and the compound (b); mixing a compound (c) containing at least one thiol (SH) group; preliminarily polymerizing the compounds; cooling the compounds; and deaerating the compounds, in which a viscosity of the composition stored in the tank is controlled during at least one of the preliminarily polymerizing, the cooling and the deaerating.

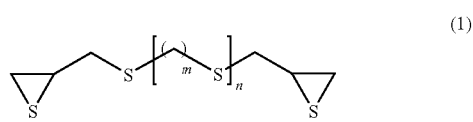

(m represents an integer of 0 to 4, and n represents an integer of 0 to 2)

According to the above aspect of the invention, the materials mentioned as (a), (b) and (c) in the above are blended in the tank and are subjected to the preliminary polymerization step, the cooling step and the deaeration step.

The viscosity of the composition in the tank can be constantly measured in the respective steps and the composition can be subjected to the next step when the viscosity of the composition has reached a predetermined value. Specifically, the viscosity of the composition in the tank is measured in the preliminary polymerization and the subsequent step (cooling step) is conducted after the viscosity has reached a predetermined level. Further, the viscosity of the composition in the tank is also constantly measured in the cooling step and the deaeration step is conducted when the viscosity has reached a predetermined level. Further, the viscosity of the composition in the tank is also constantly measured in the deaeration step and the composition is injected into the mold when the viscosity has reached a predetermined level.

The viscosity measuring and monitoring may be conducted in all of the preliminary polymerization step, the cooling step and the deaeration step or, alternatively, may be conducted in one or two of the steps.

By thus measuring the viscosity in the respective steps and conducting the next operations in accordance with the viscosity, the viscosity of the composition when being injected into the mold can be properly set. Though no specific limitation is posed on the appropriate level of viscosity when being injected in to the mold as long as the injection into the mold can be smoothly conducted, the viscosity is preferably 200 mPa·s or less, more preferably 150 mPa·s or less. When the viscosity exceeds 200 mPa·s, the injection operation cannot be easily conducted, which may impair the suitability for industrial mass production.

Incidentally, since the viscosity in the respective steps differs in accordance with the materials, the predetermined level of viscosity can be determined based on the used material so that the viscosity when being injected into the mold falls in the above range.

According to the above process, since the viscosity can be constantly measured by the viscometer attached to the tank, it is not necessary to take out a part of the composition from the tank. Thus, accurate viscosity of the composition in the tank can be measured and the viscosity of the composition in the tank can be contemporarily monitored.

Accordingly, the progress of the preliminary reaction step, the cooling step and the deaeration step can be controlled in accordance with the variation in the viscosity. Consequently, since the viscosity when being injected into the mold can be set at a proper level, an optical material that is adapted to mass production in a highly reproducible manner can be manufactured.

In the above arrangement, it is preferable that the viscosity of the composition is controlled in both the preliminarily polymerizing and the cooling.

According to the above arrangement, the viscosity in the preliminary polymerization reaction step and the cooling step is constantly measured and the composition is subjected to the next step when the viscosity has reached to the predetermined value. Since the viscosity is managed in both of the preliminary polymerization step and the cooling step, the viscosity when being injected into the mold can be more securely set at a proper level.

A manufacturing apparatus of an optical material according to another aspect of the invention, includes: a tank for blending an inorganic compound (a) containing at least one of a sulfur atom and a selenium atom and a compound (b) represented by a following formula (2), the compound (a) and the compound (b) being blended at a ratio of 1 mass % or more and 50 mass % or less of the compound (a) and 50 mass % or more and 99 mass % or less of the compound (b) relative to a total mass of a mixture of the compound (a) and the compound (b), a compound (c) containing at least one thiol (SH) group being added thereto to be subjected to a preliminary polymerization, a cooling process and a deaerating process; a viscometer that measures a viscosity of a composition stored in the tank, the viscometer having a detector immersed in the composition; and a display device that displays a measured value of the viscometer.

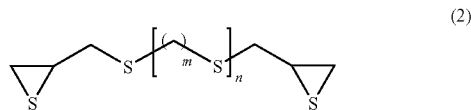

(2)

(m represents an integer of 0 to 4, and n represents an integer of 0 to 2)

According to the above aspect of the invention, since the detector of the viscometer is immersed in the composition in the tank, the viscosity of the composition in the tank can be constantly measured. Then, the viscosity of the composition in the tank is displayed on a display device for displaying a measured value detected by the viscometer.

Accordingly, the viscosity of the composition in the tank can be constantly monitored, thus achieving the above advantages.

BRIEF DESCRIPTION OF THE DRAWINGS

The invention will be described with reference to the accompanying drawings, wherein like numbers reference like elements.

FIG. 2 is a flowchart of a manufacturing process of the optical material according to the exemplary embodiment of the invention.

Figure 1:
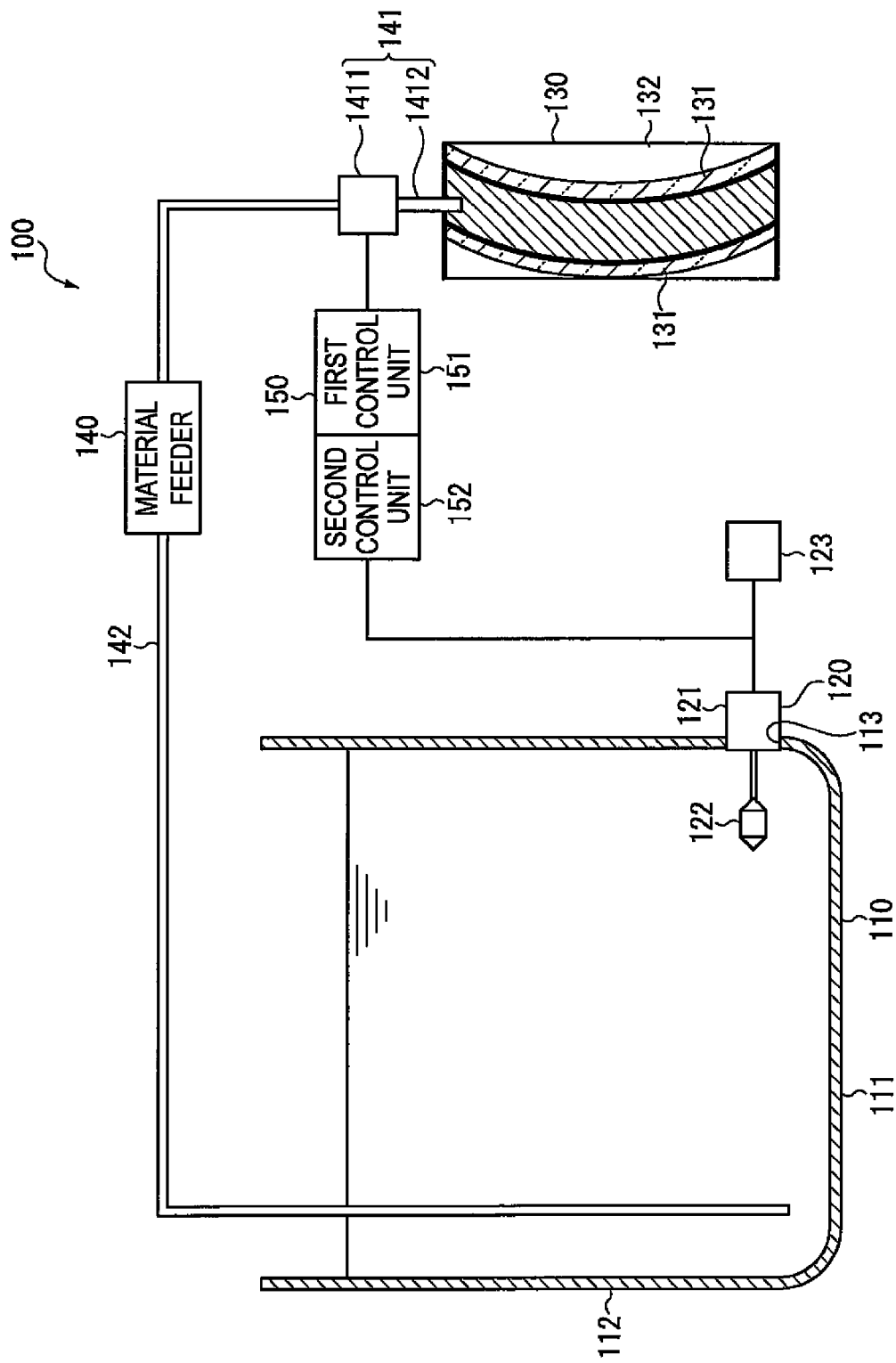
FIG. 1 is a schematic illustration of the manufacturing apparatus of optical material according to an exemplary embodiment of the invention.

DESCRIPTION OF EXEMPLARY
EMBODIMENT(S)

An exemplary embodiment will be described below in detail.

Explanation of Materials

Compound (a)

A compound (a) used in the invention includes any inorganic compound having at least one of a sulfur atom and a selenium atom.

It is preferable that the total mass ratio of the compound (a) in the optical material composition is 30% or more. When the ratio is less than 30%, since the mass ratio of the compound (a) in the optical material composition becomes small, increase in the refractive index of the resin is less prominently exhibited.

The added amount of the compound (a) is 1 parts by mass or more and 50 parts by mass or less, which is preferably 5 parts by mass or more and 50 parts by mass or less, more preferably 10 parts by mass or more and 45 parts by mass or less, further preferably 15 parts by mass or more and 40 parts by mass or less, and especially preferably 20 parts by mass or more and 35 parts by mass or less when the total of the compound (a) and the compound (b) is 100 parts by mass.

Specific examples of an inorganic compound having a sulfur atom include sulfur, hydrogen sulfide, carbon disulfide, carbon selenosulfide, ammonium sulfide, sulfur oxides such as sulfur dioxide and sulfur trioxide, thiocarbonates, sulfuric acid and salts thereof, hydrogen sulfates, sulfites, hyposulfites, persulfates, thiocyanates, thiosulfates, halides such as sulfur dichloride, thionyl chloride and thiophosgen, boron sulfide, nitrogen sulfide, silicon sulfide, phosphorus sulfide, arsenic sulfide, metal sulfides, and metal hydrosulfides. Of those, sulfur, carbon disulfide, phosphorus sulfide, selenium sulfide, metal sulfides, and metal hydrosulfides are preferable, sulfur, carbon disulfide, and selenium sulfide are more preferable, and sulfur is particularly preferable.

An inorganic compound having a selenium atom includes all inorganic compounds satisfying this condition excluding carbon selenosulfide and selenium sulfide which are given as specific examples of the inorganic compound having a sulfur atom. Specific examples thereof include selenium, hydrogen selenide, selenium dioxide, carbon diselenide, ammonium selenide, selenium oxides such as selenium dioxide, selenic acid and salts thereof, selenious acid and salts thereof, hydrogenselenates, selenosulfuric acid and salts thereof, selenopyrosulfuric acid and salts thereof halides such as selenium tetrabromide and selenium oxychloride, selenocyanates, boron selenide, phosphorus selenide, and selenides of metals. Of those, selenium, carbon diselenide, phosphorus selenide, and selenides of metals are preferable, and selenium and carbon diselenide are particularly preferable. The above compounds having a sulfur atom and a selenium atom may be used alone or in a mixture of two or more kinds thereof.

(Compound (b))

Compound (b) is the compound represented in the above Formula (1). Specific examples thereof include episulfides such as bis(β-epithiopropyl)sulfide, bis(β-epithiopropyl)disulfide, bis(β-epithiopropyl)trisulfide, bis(β-epithiopropyl)methane, 1,2-bis(β-epithiopropylthio)ethane, 1,3-bis(β-epithiopropylthio)propane, 1,2-bis(β-epithiopropylthio)propane, 1,4-(β-epithiopropylthio)butane, and bis(β-epithiopropylthioethyl)sulfide. The above compound (b) may be used alone or in a mixture of two or more kinds thereof. Of those, a preferable example is bis(β-epithiopropyl)sulfide and/or bis(β-epithiopropyl)disulfide and the most preferable, specific example is bis(β-epithiopropyl)sulfide.

The added amount of the compound (b) is 50 parts by mass or more and 99 parts by mass or less, which is preferably 50 parts by mass or more and 95 parts by mass or less, more preferably 60 parts by mass or more and 90 parts by mass or less, further preferably 65 parts by mass or more and 85 parts by mass or less, and especially preferably 70 parts by mass or more and 80 parts by mass or less when the total of the compound (a) and the compound (b) is 100 parts by mass.

Compound (c)

The compound (c) is a compound having one or more thiol (SH) group. Since thiol (SH) group includes an active hydrogen, adding thiol group to the compound (a) and the compound (b) results in a less yellowish optical material. Further, in order to obtain a low-viscosity compound, it is preferable that the compound (c) is a compound containing a single thiol (SH) group.

In order to maintain a high refractive index of the optical material, the compound (c) preferably includes an aromatic ring. In order to provide a less yellowish optical material, the molecular weight of the compound (c) is preferably less than 200. In addition, in order to provide a liquid or solid, less odorous and easy-to-handle compound (c), the molecular weight of the compound (c) is preferably 100 or more.

Specific examples of compound (c) includes methylmercaptan, ethylmercaptan, n-propylmercaptan, n-butylmercaptan, n-hexylmercaptan, n-octylmercaptan, n-decylmercaptan, n-dodecylmercaptan, n-tetradecylmercaptan, n-hexadecylmercaptan, n-octadecylmercaptan, i-propylmercaptan, t-butylmercaptan, t-nonylmercaptan, t-dodecylmercaptan, allylmercaptan, 2-mercaptoethanol, 2-(2-mercaptoethylthio)ethanol, 3-mercapto-1,2-propanediol, 2-mercapto-1,3-propanediol, mercaptoacetic acid, mercaptoglycolic acid, mercaptopropionic acid, methyl mercaptoglycolate, methyl mercaptopropionate, methyl (2-mercaptoethylthioacetate), methyl (2-mercaptoethylthiopropionate), 2-dimethylaminoethanethiol, 2-diethylaminoethanethiol, 2-dibutylaminoethanethiol, 2-(1-pyroridinyl)ethanethiol, 2-(1-piperidinyl)ethanethiol, 2-(4-morpholinyl)ethanethiol, 2-(N-methylanilino)ethanethiol, 2-(N-ethylanilino)ethanethiol, 2(2-mercaptoethylmethylamino)-ethanethiol, cyclopentylmercaptan, cyclohexylmercaptan, mercapto-1,4-dithiane, mercaptomethyl-1,4-dithiane, mercaptoethylthiomethyl-1,4-dithiane, thiophenol, 4-hydroxythiophenol, 2-methylthiophenol, 3-methylthiophenol, 4-methylthiophenol, 4-t-butylthiophenol, 2,4-dimethylthiophenol, 2,5-dimethylthiophenol, 3-methoxythiophenol, 4-methoxythiophenol, 5-t-butyl-2-methylthiophenol, 2-chlorothiophenol, 3-chlorothiophenol, 4-chlorothiophenol, 2,5-dichlorothiophenol, 3,4-dichlorothiophenol, 2,3-dichlorothiophenol, 2,6-dichlorothiophenol, 3,5-dichlorothiophenol, 2,4-dichlorothiophenol, 2,4,5-dichlorothiophenol, pentachlorothiophenol, 2-amino-4-chlorothiophenol, 2-bromothiophenol, 3-bromothiophenol, 4-bromothiophenol, 4-nitrothiophenol, 2-aminothiophenol, 3-aminothiophenol, 4-aminothiophenol, benzylmercaptan, 4-methoxybenzylmercaptan, 4-chlorobenzylmercaptan, 2,4-dichlorobenzylmercaptan, 4-bromobenzylmercaptan, 3-vinylbenzylmercaptan, 4-vinylbenzylmercaptan, 2-phenylthioethanethiol, 2-benzylthioethanethiol, 2-mercaptonaphthalene, 1-mercaptofuran, 2-mercaptofuran, 1-mercaptomethylfuran, 2-mercaptomethylfuran, 1-mercaptothiophene, 2-mercaptothiophene, 1-mercaptomethylthiophene, 2-mercaptomethylthiophene, 2-mercaptopyridine, 4-mercaptopyridine, 2-mercaptobiphenyl, 4-mercaptobiphenyl, and mercaptobenzoic acid. The above compound (b) may be used alone or in a mixture of two or more kinds thereof. Of those, a preferable example is thiophenol, 2-methylthiophenol, 3-methylthiophenol, 4-methylthiophenol, benzylmercaptan, 4-chlorobenzylmercaptan, 1-mercaptomethylfuran, 2-mercaptoethanol, and cyclohexylmercaptan, and the most preferable, specific example is benzylmercaptan.

The added amount of the compound (c) is 1 parts by mass or more and 20 parts by mass or less, which is preferably 2 parts by mass or more and 18 parts by mass or less, more preferably 3 parts by mass or more and 15 parts by mass or less, further preferably 4 parts by mass or more and 12 parts by mass or less, and especially preferably 5 parts by mass or more and 10 parts by mass or less when the total of the compound (a) and the compound (b) is 100 parts by mass.

Polymerization Catalyst

Further, when polymerizing and curing the above materials, a polymerization catalyst may be added where necessary. Examples of the polymerization catalysts include amines, phosphines, quaternary ammonium salts, quaternary phosphonium salts, and condensation products of aldehydes and amine-based compounds, salts of carboxylic acids with ammonia, urethanes, thiourethanes, guanidines, thioureas, thiazoles, sulfenamides, thiurams, dithiocarbamic acid salts, xanthic acid salt, tertiary sulfonium salts, secondary iodonium salts, mineral acids, Lewis acids, organic acids, silicic acids, tetrafluoroboric acid, peroxides, azo-based compounds, and acid phosphoric acid esters.

Examples of the amines include primary amines such as ethylamine, n-propylamine, sec-propylamine, n-butylamine, sec-butylamine, i-butylamine, tert-butylamine, pentylamine, hexylamine, heptylamine, octylamine, decylamine laurylamine, myristylamine, 1,2-dimethylhexylamine, 3-pentylamine, 2-ethylhexylamine, allylamine, aminoethanol, 1-aminopropanol, 2-aminopropanol, aminobutanol, aminopentanol, aminohexanol, 3-ethoxypropylamine, 3-propoxypropylamine, 3-isopropoxypropylamine, 3-butoxypropylamine, 3-isobutoxypropylamine, 3-(2-ethylhexyloxy)propylamine, aminocyclopentane, aminocyclohexane, aminonorbornene, aminomethylcyclohexane, aminobenzene, benzylamine, phenethylamine, α-phenylethylamine, naphthylamine, and fufurylamine; primary polyamines such as ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, dimethylaminopropyl amine, diethylaminopropyl amine, bis(3-aminopropyl)ether, 1,2-bis-(3-aminopropoxy)ethane, 1,3-bis-(3-aminopropoxy)-2,2'-dimethylpropane, aminoethylethanol amine, 1,2-, 1,3- or 1,4-bisaminocyclohexane, 1,3- or 1,4-bisaminomethylcyclohexane, 1,3- or 1,4-bisaminoethylcyclohexane, 1,3- or 1,4-bisaminopropylcyclohexane, hydrogenated 4,4'-diaminodiphenylmethane, 2- or 4-aminopiperidine, 2- or 4-aminomethylpiperidine, 2- or 4-aminoethylpiperidine, N-aminoethylpiperidine, N-aminopropylpiperidine, N-aminoethylmorpholine, N-aminopropylmorpholine, isophoronediamine, menthandiamine, 1,4-bisaminopropylpiperazine, o-, m- or p-phenylenediamine, 2,4- or 2,6-tolylenediamine, 2,4-toluenediamine, m-aminobenzylamine, 4-chloro-o-phenylenediamine, tetrachloro-p-xylylenediamine, 4-methoxy-6-methyl-m-phenylenediamine, m- or p-xylylenediamine, 1,5- or 2,6-naphthalenediamine, benzidine, 4,4'-bis(o-toluidine), dianisidine, 4,4'-diaminodiphenylmethane, 2,2-(4,4'-diaminodiphenyl)propane, 4,4'-diaminodiphenylether, 4,4'-thiodianiline, 4,4'-diaminodiphenylsulfone, 4,4'-diaminoditolylsulfone, methylenebis(o-chloroaniline), 3,9-bis(3-aminopropyl)-2,4,8,10-tetraoxaspiro[5.5]undecane, diethylenetriamine, iminobispropylamine, methyliminobispropylamine, bis(hexamethylene)triamine, triethylenetetramine, tetraethylenepentamine, pentaethylenehexamine, N-aminoethylpiperazine, N-aminopropylpiperazine, 1,4-bis(aminoethyl)piperazine, 1,4-bis(aminopropyl)piperazine, 2,6-diaminopyridine, and bis(3,4-diaminophenyl)sulfone; secondary amines such as diethylamine, dipropylamine, di-n-butylamine, di-sec-butylamine, diisobutylamine, di-n-pentylamine, di-3-pentylamine, dihexylamine, dioctylamine, di(2-ethylhexyl)amine, methylhexylamine, diallylamine, pyrrolidine, piperidine, 2-, 3- or 4-picoline, 2,4-, 2,6- or 3,5-lupetidine, diphenylamine, N-methylaniline, N-ethylaniline, dibenzylamine, methylbenzylamine, dinaphthylamine, pyrrole, indoline, indole, and morpholine; secondary polyamines such as N,N'-dimethylethylene diamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylene diamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,6-diaminohexane, piperazine, 2-methylpiperazine, 2,5- or 2,6-dimethylpiperazine, homopiperazine, 1,1-di-(4-piperidyl)methane, 1,2-di-(4-piperidyl)ethane, 1,3-di-(4-piperidyl)propane, 1,4-di-(4-piperidyl)butane, and tetramethylguanidine; tertiary amines such as trimethylamine, triethylamine, tri-n-propylamine, tri-iso-propylamine, tri-1,2-dimethypropylamine, tri-3-methoxypropylamine, tri-n-butylamine, tri-iso-butylamine, tri-sec-butylamine, tri-pentylamine, tri-3-pentylamine, tri-n-hexylamine, tri-n-octylamine, tri-2-ethylhexylamine, tri-dodecylamine, tri-laurylamine, dicyclohexylethylamine, cyclohexyldiethylamine, tri-cyclohexylamine, N,N-dimethylhexylamine, N-methyldihexylamine, N,N-dimethylcyclohexylamine, N-methyldicyclohexylamine, N,N-diethylethanolamine, N,N-dimethylethanolamine, N-ethyldiethanolamine, triethanolamine, tribenzylamine, N,N-dimethylbenzylamine, diethylbenzylamine, triphenzylamine, N,N-dimethylamino-p-cresol, N,N-dimethylaminomethylphenol, 2-(N,N-dimethylaminomethyl)phenol, N,N-dimethylaniline, N,N-diethylaniline, pyridine, quinoline, N-methylmorpholine, N-methylpiperidine, and 2(2-dimethylaminoethoxy)-4-methyl-1,3,2-dioxabornane; tertiary polyamines such as tetramethylethylenediamine, pyrazine, N,N'-dimethylpiperazine, N,N'-bis((2-hydroxy)propyl)piperazine, hexamethylenetetramine, N,N,N',N'-tetramethyl-1,3-butaneamine, 2-dimethylamino-2-hydroxypropane, diethylaminoethanol, N,N,N-tris(3-dimethylaminopropyl)amine, 2,4,6-tris(N,N-dimethylaminomethyl)phenol, and heptamethyl isobiguanide; imidazoles such as imidazole, N-methylimidazole, 2-methylimidazole, 4-methylimidazole, N-ethylimidazole, 2-ethylimidazole, 4-ethylimidazole, N-butylimidazole, 2-butylimidazole, N-undecylimidazole, 2-undecylimidazole, N-phenylimidazole, 2-phenylimidazole, N-benzylimidazole, 2-benzylimidazole, 1-benzyl-2-methylimidazole, N-(2'-cyanoethyl)-2-methylimidazole, N-(2'-cyanoethyl)-2-undecylimidazole, N-(2'-cyanoethyl)-2-phenylimidazole, 3,3-bis-(2-ethyl-4-methylimidazolyl)methane, 2-mercaptoimidazole, 2-mercapto-1-methylimidazole, 2-mercaptobenzimidazole, 3-mercapto-4-methyl-4H-1,2,4-triazole, 5-mercapto-1-methyl-tetrazole, 2,5-dimercapto-1,3,4-thiadiazole, an addition product of alkylimidazole and isocyanuric acid, and a condensation product of alkylimidazole and formaldehyde; pyrazoles such as 3,5-dimethylpyrazole, 3,5-di(2-pyridyl)pyrazole, 3,5-dimethyl-1-hydroxymethylpyrazole, 3,5-diisopropylpyrazole, 3,5-dimethyl-1-phenylpyrazole, 3-methylpyrazole, 4-methylpyrazole, N-methylpyrazole, and 5-(thienyl)pyrazole; and amidines such as 1,8-diazabicyclo[5,4,0]undecene-7,1,5-diazabicyclo[4,3,0]nonene-5, and 6-dibutylamino-1,8-diazabicyclo[5,4,0]undecene-7.

Examples of phosphines include trimethylphosphine, triethylphosphine, tri-iso-propylphosphine, tri-n-butylphosphine, tri-n-hexylphosphine, tri-n-octylphosphine, tricyclohexylphosphine, triphenylphosphine, tribenzylphosphine, tris(2-methylphenyl)phosphine, tris(3-methylphenyl)phosphine, tris(4-methylphenyl)phosphine, tris(diethylamino)phosphine, dimethylphenylphosphine, diethylphenylphosphine, dicyclohexylphenylphosphine, ethyldiphenylphosphine, diphenylcyclohexylphosphine, and chlorodiphenylphosphine.

Examples of the quaternary ammonium salts include tetramethylammonium chloride, tetramethylammonium bromide, tetramethylammonium acetate, tetraethylammonium chloride, tetraethylammonium bromide, tetraethylammonium acetate, tetra-n-butylammonium fluoride, tetra-n-butylammonium chloride, tetra-n-butylammonium bromide, tetra-n-butylammonium iodide, tetra-n-butylammonium acetate, tetra-n-butylammonium borohydride, tetra-n-butylammonium hexafluorophosphite, tetra-n-butylammonium hydrogensulfite, tetra-n-butylammonium tetrafluoroborate, tetra-n-butylammonium tetraphenylborate, tetra-n-butylammonium paratoluenesulfonate, tetra-n-hexylammonium chloride, tetra-n-hexylammonium bromide, tetra-n-hexylammonium acetate, tetra-n-octylammonium chloride, tetra-n-octylammonium bromide, tetra-n-octylammonium acetate, trimethyl-n-octylammonium chloride, trimethyldecylammonium chloride, trimethylacetylammonium chloride, trimethyllaurylammonium chloride, trimethylbenzylammonium chloride, trimethylbenzylammonium bromide, triethyl-n-octylammonium chloride, triethylbenzylammonium chloride, triethylbenzylammonium bromide, tri-n-butyl-n-octylammonium chloride, tri-n-butylbenzylammonium fluoride, tri-n-butylbenzylammonium chloride, tri-n-butylbenzylammonium bromide, tri-n-butylbenzylammonium iodide, n-butyldimethylbenzylammonium chloride, n-octyldimethylbenzylammonium chloride, decyldimethylbenzylammonium chloride, dodecyldimethylbenzylammonium chloride, cetyldimethylbenzylammonium chloride, lauryldimethylbenzylammonium chloride, methyltriphenylammonium chloride, methyltribenzylammonium chloride, methyltriphenylammonium bromide, methyltribenzylammonium bromide, ethyltriphenylammonium chloride, ethyltribenzylammonium chloride, ethyltriphenylammonium bromide, ethyltribenzylammonium bromide, n-butyltriphenylammonium chloride, n-butyltribenzylammonium chloride, n-butyltriphenylammonium bromide, n-butyltribenzylammonium bromide, 1-methylpyridinium chloride, 1-methylpyridinium bromide, 1-ethylpyridinium chloride, 1-ethylpyridinium bromide, 1-n-butylpyridinium chloride, 1-n-butylpyridinium bromide, 1-n-hexylpyridinium chloride, 1-n-hexylpyridinium bromide, 1-n-octylpyridinium bromide, 1-n-dodecylpyridinium chloride, 1-n-dodecylpyridinium bromide, 1-n-cetylpyridinium chloride, 1-n-cetylpyridinium bromide, 1-phenylpyridinium chloride, 1-phenylpyridinium bromide, 1-benzylpydinium chloride, 1-benzylpyridinium bromide, 1-methylpicolinium chloride, 1-methylpicolinium bromide, 1-ethylpicolinium chloride, 1-ethylpicolinium bromide, 1-n-butylpicolinium chloride, 1-n-butylpicolinium bromide, 1-n-hexylpicolinium chloride, 1-n-hexylpicolinium bromide, 1-n-octylpicolinium chloride, 1-n-octylpicolinium bromide, 1-n-dodecylpicolinium chloride, 1-n-dodecylpicolinium bromide, 1-n-cetylpicolinium chloride, 1-n-cetylpicolinium bromide, 1-phenylpicolinium chloride, 1-phenylpicolinium bromide, 1-benzylpicolinium chloride, and 1-benzylpicolinium bromide.

Examples of the quaternary phosphonium salts include tetramethylphosphonium chloride, tetramethylphosphonium bromide, tetraethylphosphonium chloride, tetraethylphosphonium bromide, tetra-n-butylphosphonium chloride, tetra-n-butylphosphonium bromide, tetra-n-butylphosphonium iodide, tetra-n-hexylphosphonium bromide, tetra-n-octylphosphonium bromide, methyltriphenylphosphonium bromide, methyltriphenylphosphonium iodide, ethyltriphenylphosphonium bromide, ethyltriphenylphosphonium iodide, n-butyltriphenylphosphonium bromide, n-butyltriphenylphosphonium iodide, n-hexyltriphenylphosphonium bromide, n-octyltriphenylphosphonium bromide, tetraphenylphosphonium bromide, terakishydroxymethylphosphonium chloride, terakishydroxymethylphosphonium bromide, terakishydroxyethylphosphonium chloride, and terakishydroxybutylphosphonium chloride.

Examples of the condensation products of aldehydes and amine-based compounds include a reaction product of acetaldehyde and ammonia, a condensation product of formaldehyde and paratoluidine, a condensation product of acetaldehyde and paratoluidine, a reaction product of formaldehyde and aniline, a reaction product of acetaldehyde and aniline, a reaction product of butylaldehyde and aniline, a reaction product of formaldehyde, acetaldehyde, and aniline, a reaction product of acetaldehyde, butylaldehyde, and aniline, a condensation product of butylaldehyde and monobutylamine, a reaction product of butylaldehyde and butylidene-aniline, a reaction product of heptaldehyde and analine, a reaction product of tricrotonilidene-tetramine, a condensation product of α-ethyl-β-propylacrolein and aniline, and a condensation product of formaldehyde and alkylimidazole.

Examples of the salts of the carboxylic acids with ammonia include ammonium acetate, ammonium benzoate, ammonium carbamate, and ammonium trifluoroacetate.

Examples of the urethanes are obtainable by reacting alcohols with isocyanates.

Examples of the thiourethanes are obtainable by reacting mercaptans with isocyanates.

Examples of the guanidines include diphenylguanidine, phenyltolylguanidine, phenylxylylguanidine, tolylxylylguanidine, diorthotolylguanidine, orthotolylguanide, diphenylguanidine phthalate, tetramethylguanidine, guanidinethiocyanate, triphenylguanidine, aminoguanidine sulfate, 1,3-diphenylguanidine sulfate, and diorthotolylguanidine salt of dicatechol borate.

Examples of the thioureas include thiocarboanilide, diorthotolylthiourea, ethylenethiourea, diethylthiourea, dibutylthiourea, dilaurylthiourea, trimethylthiourea, dimethylethylthiourea, tetramethylthiourea, 1,3-diphenyl-2-thiourea, 1-allyl-2-thiourea, and guanylthiourea.

Examples of the thiazoles include 2-mercaptobenzothiazole, dibenzothiazyl disulfide, a cyclohexylamine salt of 2-mercaptobenzothiazole, 2-(2-,4-dinitrophenylthio)benzothiazole, 2-(morpholinodithio)benzothiazole, 2-(2-,6-dimethyl-4-morpholinothio)benzothiazole, N,N-diethylthiocarbamoyl-2-benzothiazolyl sulfide, 1,3-bis(2-benzothiazolylmercaptomethyl)urea, benzothiadiazyl thiobenzoate, 2-mercaptothiazoline, 2-mercapto-5-methyl-1,3,4-thizaole, 2-mercapto-5-methylthio-1,3,4-thiazole, 2-(morpholinothio)benzothiazole, a sodium salt of 2-mercaptobenzothiazole, a zinc salt of 2-mercaptobenzothiazole, and a complex salt of dibenzothiazyl disulfide and zinc chloride.

Examples of the sulfenamides include N-cyclohexyl-2-benzothiazylsulfenamide, N-tert-butyl-2-benzothiazylsulfenamide, N-tert-octyl-2-benzothiazylsulfenamide, N-oxydiethylene-2-benzothiazylsulfenamide, N,N-diethyl-2-benzothiazylsulfenamide, N,N-diisopropyl-2-benzothiazylsulfenamide, and N,N-dicyclohexyl-2-benzothiazylsulfenamide.

Examples of the thiurams include tetramethylthiuram monosulfide, tetraethylthiuram monosulfide, tetrabutylthiuram monosulfide, dipentamethylenethiuram monosulfide, tetramethylthiuram disulfide, tetraethylthiuram disulfide, tetrabutylthiuram disulfide, N,N'-dimethyl-N,N'-diphenylthiuram disulfide, N,N'-diethyl-N,N'-diphenylthiuram disulfide, dipentamethylenethiuram disulfide, dipentamethylenethiuram tetrasulfide, and cyclic thiuram.

Examples of the dithiocarbamic acid salts include sodium dimethyl dithiocarbamate, sodium diethyl dithiocarbamate, sodium dibutyl dithiocarbamate, sodium pentamethylene dithiocarbamate, sodium cyclohexylethyl dithiocarbamate, potassium dimethyl dithiocarbamate, lead dimethyl dithiocarbamate, zinc dimethyl dithiocarbamate, zinc diethyl dithiocarbamate, zinc dibutyl dithiocarbamate, zinc diphenyl dithiocarbamate, zinc dibenzyl dithiocarbamate, zinc pentamethylene dithiocarbamate, zinc dimethylpentamethylene dithiocarbamate, zinc ethylphenyl dithiocarbamate, bismuth dimethyl dithiocarbamate, cadmium diethyl dithiocarbamate, cadmium pentamethylene dithiocarbamate, selenium dimethyl dithiocarbamate, selenium diethyl dithiocarbamate, tellurium dimethyl dithiocarbamate, tellurium diethyl dithiocarbamate, iron dimethyl dithiocarbamate, copper dimethyl dithiocarbamate, diethyl ammonium diethyl dithiocarbamate, N,N-cyclohexylammonium dibutyl dithiocarbamate, piperidine pentamethylene dithiocarbamate, cyclohexylethylammonium sodium cyclohexylethyl dithiocarbamate, pipecoline methylpentamethylene dithiocarbamate, pipecolium pipecolyl dithiocarbamate, zinc N-phenyl dithiocarbamate, and a complex compound of zinc pentamethylene dithiocarbamate and piperidine.

Examples of the xanthic acid salts include sodium isopropylxanthate, zinc isopropylxanthate, zinc butylxanthate, and dibutylxanthic disulfide.

Examples of the tertiary sulfonium salts include trimethylsulfonium bromide, triethylsulfonium bromide, tri-n-butylsulfonium chloride, tri-n-butylsulfonium bromide, tri-n-butylsulfonium iodide, tri-n-butylsulfonium tetrafluoroborate, tri-n-hexylsulfonium bromide, tri-n-octylsulfonium bromide, triphenylsulfonium chloride, triphenylsulfonium bromide, and triphenylsulfonium iodide.

Examples of the secondary iodonium salts include diphenyliodonium chloride, diphenyliodonium bromide, and diphenyliodonium iodide.

Examples of the mineral acids include hydrochloric acid, sulfuric acid, nitric acid, phosphoric acid, and carbonic acid, and half esters thereof.

Examples of the Lewis acids include boron trifluoride and etherate of boron trifluoride.

Organic acids and half esters thereof, and silicic acid and tetrafluoroboric acids may also be used.

Examples of the peroxides include peroxides such as cumyl peroxyneodecanoate, diisopropyl peroxydicarbonate, diallyl peroxydicarbonate, di-n-propyl peroxydicarbonate, dimyristyl peroxydicarbonate, cumyl peroxyneohexanoate, tert-hexyl peroxyneodecanoate, tert-butyl peroxyneodecanoate, tert-hexyl peroxyneohexanoate, tert-butyl peroxyneohexanoate, 2,4-dichlorobenzoyl peroxide, benzoyl peroxide, dicumyl peroxide, and di-tert-butyl peroxide; and cumene hydroperoxide and tert-butyl hydroperoxide.

Examples of the azo-based compounds include 2,2'-azobis(4-methoxy-2,4-dimethylvaleronitrile), 2,2'-azobis(2-cyclopropylpropionitrile), 2,2'-azobis(2,4-dimethylvaleronitrile), 2,2'-azobisisobutyronitrile, 2,2'-azobis(2-methylbutyronitrile), 1,1'-azobis(cyclohexane-1-carbonitrile), 1-[(1-cyano-1-methylethyl)azo]formamide, 2-phenylazo-4-methoxy-2,4-dimethyl-valeronitrile, 2,2'-azobis(2-methylpropane), and 2,2'-azobis(2,4,4-trimethylpentane).

Examples of the acid phosphoric acid esters include mono- and/or dimethyl phosphate, mono- and/or diethyl phosphate, mono- and/or dipropyl phosphate, mono- and/or dibutyl phosphate, mono- and/or dihexyl phosphate, mono- and/or dioctyl phosphate, mono- and/or didecyl phosphate, mono- and/or didodecyl phosphate, mono- and/or diphenyl phosphate, mono- and/or dibenzyl phosphate, and mono- and/or decanol phosphate.

Thus, the polymerization catalysts have been described above but are not limited thereto as long as they exhibit the effect of polymerizing and curing. Further, they may be used alone or in a mixture of two or more kinds thereof. Preferable specific examples thereof include quaternary ammonium salts such as tetra-n-butylammonium bromide, triethylbenzylammonium chloride, cetyldimethylbenzylammonium chloride, and 1-n-dodecylpyridinium chloride; and quaternary phosphonium salts such as tetra-n-butylphosphonium bromide and tetraphenylphosphonium bromide. Of those, more preferable specific examples include triethylbenzylammonium chloride and/or tetra-n-butylphosphonium bromide, and the most preferable specific example is tetra-n-butylphosphonium bromide.

The additive amount of the polymerization catalyst is 0.001 parts by mass or more and 5 parts by mass or less relative to the total 100 parts by mass of the compound (a) and the compound (b), which is preferably 0.002 parts by mass or more and 5 parts by mass or less and more preferably 0.005 parts by mass or more and 3 parts by mass or less.

Polymerization Adjusting Agent

A polymerization adjusting agent may be added when the above materials are polymerized to be cured in order to prolong the pot life and disperse the polymerization heat. The polymerization adjusting agent includes a halide belonging to groups 13 to 16 of the long form periodic table. Representative specific examples are listed below.

Examples of the silane halides include silicon tetrachloride, methyltrichlorosilane, dimethyldichlorosilane, trimethylchlorosilane, ethyltrichlorosilane, diethyldichlorosilane, triethylchlorosilane, propyltrichlorosilane, dipropyldichlorosilane, tripropylchlorosilane, n-butyltrichlorosilane, di-n-butyldichlorosilane, tri-n-butylchlorosilane, tert-butyltrichlorosilane, di-tert-butyldichlorosilane, tri-tert-butylchlorosilane, octyltrichlorosilane, dioctyldichlorosilane, trioctylchlorosilane, phenyltrichlorosilane, diphenyldichlorosilane, triphenylchlorosilane, allylchlorodimethylsilane, trichloroallylsilane, tert-butylchlorodimethylsilane, diphenyl-tert-butylchlorosilane, tert-butoxychlorodiphenylsilane, trimethyl(2-chloroallyl)silane, trimethylchloromethylsilane, n-butylchlorodimethylsilane and compounds obtained by substituting all or part of the chlorines thereof with fluorine, bromine, or iodine.

Examples of the germanium halides include germanium tetrachloride, methylgermanium trichloride, dimethylgermanium dichloride, trimethylgermanium chloride, ethylgermanium trichloride, diethylgermanium dichloride, triethylgermanium chloride, propylgermanium trichloride, dipropylgermanium dichloride, tripropylgermanium chloride, n-butylgermanium trichloride, di-n-butylgermanium dichloride, tri-n-butylgermanium chloride, tert-butylgermanium trichloride, di-tert-butylgermanium dichloride, tri-tert-butylgermanium chloride, amylgermanium trichloride, diamylgermanium dichloride, triamylgermanium chloride, octylgermanium trichloride, dioctylgermanium dichloride, trioctylgermanium chloride, phenylgermanium trichloride, diphenylgermanium dichloride, triphenylgermanium chloride, toluylgermanium trichloride, ditoluylgermanium dichloride, tritoluylgermanium chloride, benzylgermanium trichloride, dibenzylgermanium dichloride, tribenzylgermanium chloride, cyclohexylgermanium trichloride, dicyclohexylgermanium dichloride, tricyclohexylgermanium chloride, vinylgermanium trichloride, divinylgermanium dichloride, trivinylgermanium chloride, allyltrichlorogermane, bis(chloromethyl)dimethylgermane, chloromethyltrichlorogermane, tert-butyldimethylchlorogermane, carboxyethyltrichlorogermane, chloromethyltrimethylgermane, dichloromethyltrimethylgermane, 3-chloropropyltrichlorogermane, phenyldimethylchlorogermane, 3-(trichlorogermyl)propionyl chloride, and compounds obtained by substituting all or part of the chlorines thereof with fluorine, bromine, or iodine.

Examples of the tin halides include tin tetrachloride, diethyldichlorosilane, dimethyltin dichloride, trimethyltin chloride, ethyltin trichloride, diethylgetin dichloride, triethyltin chloride, propyltin trichloride, dipropyltin dichloride, tripropyltin chloride, n-butyltin trichloride, di-n-butyltin dichloride, tri-n-butyltin chloride, tert-butyltin trichloride, di-tert-butyltin dichloride, tri-tert-butyltin chloride, amyltin trichloride, diamyltin dichloride, triamyltin chloride, octyltin trichloride, dioctyltin dichloride, trioctyltin chloride, phenyltin trichloride, diphenyltin dichloride, triphenyltin chloride, toluyltin trichloride, ditoluyltin dichloride, tritoluyltin chloride, benzyltin trichloride, dibenzyltin dichloride, tribenzyltin chloride, cyclohexyltin trichloride, dicyclohexyltin dichloride, tricyclohexyltin chloride, vinyltin trichloride, divinyltin dichloride, trivinyltin chloride, butylchlorodihydroxytin, bis(2,4-pentadionate)dichlorotin, carbomethoxyethyltrichlorotin, chloromethyltrimethyltin, diallyldichlorotin, dibutylbutoxychlorotin, tri-n-pentylchlorotin, and compounds obtained by substituting all or part of the chlorines thereof with fluorine, bromine, or iodine.

Examples of the antimony halides include antimony pentachloride, methylantimony tetrachloride, dimethylantimony trichloride, trimethylantimony dichloride, tetramethylantimony chloride, ethylantimony tetrachloride, diethylantimony trichloride, triethylantimony dichloride, tetraethylantimony chloride, butylantimony tetrachloride, dibutylantimony trichloride, tributylantimony dichloride, tetrabutylantimony chloride, phenylantimony tetrachloride, diphenylantimony trichloride, triphenylantimony dichloride, tetraphenylantimony chloride, and compounds obtained by substituting all or part of the chlorines thereof with fluorine, bromine, or iodine.

Further examples of the halides include chlorides such as aluminum chloride, indium chloride, thallium chloride, phosphorus trichloride, phosphorus pentachloride, bismuth trichloride, and compounds obtained by substituting all or part of these chlorides with fluorine, bromine, or iodine; compounds having halogen and a hydrocarbon group such as diphenylchloroboron, phenyldichloroboron, diethylchlorogallium, dimethylchloroindium, diethylchlorothallium, diphenylchlorothallium, ethyldichlorophosphine, butyldichlorophosphine, triphenylphosphine dichloride, diphenylchloroarsenic, tetraphenylchloroarsenic diphenyldichloroselenium, phenylchloroselenium, and diphenyldichlorotellurium, and compounds obtained by substituting all or part of the chlorines thereof with fluorine, bromine, or iodine; organic halides represented by halogen-substituted products of hydrocarbons such as chlorophenol, dichlorophenol, trichlorophenol, chloroaniline, dichloroaniline, chloronitrtobenzene, dichloronitrtobenzene, chlorobenzene, dichlorobenzene, trichlorobenzene, chloroacetophenone, chlorotoluene, chloronitroaniline, chlorobenzyl cyanide, chlorobenzaldehyde, chlorobenzo trichloride, chloronaphthalene, dichloronaphthalene, chlorothiophenol, dichlorothiophenol, methallyl chloride, benzyl chloride, chlorobenzyl chloride, chloroacetic acid, dichloroacetic acid, trichloroacetic acid, chlorosuccinic acid, oxalic dichloride, triglycol dichloride, methanesulfonyl chloride, chlorobenzoic acid, chlorosalicylic acid, 4,5-dichlorophthalic acid, 3,5-dichlorosalicylic acid, isopropyl chloride, allyl chloride, epichlorohydrin, chloromethylthiirane, propylene chlorohydrin, chloranil, dichlorodicyanobenzoquinone, dichlorophene, dichloro-1,4-benzoquinone, dichlorobenzophenone, N-chlorophtalimide, 1,3-dichloro-2-propanol, methyl 2,3-dichloropropionate, p-chlorobenzenesulfonic acid, ethyl 2-chloropropionate, dichloromethane, chloroform, and carbon tetrachloride, and acid chlorides such as benzoic chloride, phthalic chloride, isophthalic chloride, terephthalic chloride, methacrylic chloride, succinic chloride, fumaric chloride, nicotinic chloride, chloronicotinic chloride, oleic chloride, benzoyl chloride, chlorobenzoyl chloride, and propionic chloride, and compounds obtained by substituting all or part of the chlorines thereof with fluorine, bromine, or iodine.

The polymerization adjusting agents may be used alone or in a mixture of two or more kinds thereof. Preferable are silicon, germanium, tin, and antimony halides. More preferable are silicon, germanium, tin, and antimony chlorides, and even more preferable are germanium, tin, and antimony chlorides each having an alkyl group. Specific examples of the most preferred compounds are dibutyltin dichloride, butyltin trichloride, dioctyltin dichloride, octyltin trichloride, dibutyldichlorogermanium, butyltrichlorogermanium, diphenyldichlorogermanium, phenyltrichlorogermanium, and triphenylantimony dichloride.

The additive amount of the polymerization adjusting agent is 0.001 parts by mass or more and 5 parts by mass or less relative to the total 100 parts by mass of the compound (a) and the compound (b), which is preferably 0.002 parts by mass or more and 5 parts by mass or less and more preferably 0.005 parts by mass or more and 3 parts by mass or less.

Preliminary Polymerization Catalyst

A preliminary polymerization catalyst for promoting the reaction may be added when the materials are preliminarily reacted. The preliminary polymerization catalyst is the same compound as the above-mentioned polymerization catalyst, which is preferably a compound containing a nitrogen or phosphorous atom and is more preferably a compound containing a nitrogen or phosphorous atom and an unsaturated link. Especially preferable preliminary polymerization catalyst is imidazoles, which is the most preferably 2-mercapto-1-methylimidazole. The additive amount of the preliminary polymerization catalyst is 0.001 parts by mass or more and 5 parts by mass or less relative to the total 100 parts by mass of the compound (a) and the compound (b), which is preferably 0.002 parts by mass or more and 5 parts by mass or less and more preferably 0.005 parts by mass or more and 3 parts by mass or less.

Other Additive

In order to improve various properties such as oxidation resistance, weather resistance, dye affinity, strength and refractive index, it is possible to add a compound that is adapted to react with a part or all of the component compounds before polymerization-curing. In this case, known polymerization catalyst may be separately added as necessary for promoting the reaction.

Examples of the compound that is adapted to react with a part or all of the component compounds are compounds having two or more SH groups, epoxy compounds, iso(thio) cyanates, carboxylates, anhydrous carboxylates, phenols, amines, vinyl compounds, allyl compounds, acryl compounds and methacryl compounds Representative specific examples are listed below.

Examples of the compounds having 2 or more SH groups include bis(2-mercaptoethyl)sulfide, bis(2,3-dimercaptopropyl)sulfide, 1,2-bis(2-mercaptoethylthio)ethane, 2-(2-mercaptoethylthio)-1,3-dimercaptopropane, 1,2-bis(2-mercaptoethylthio)-3-mercaptopropane, 4-mercaptomethyl-1,8-dimercapto-3,6-dithiaoctane, 2,4-bis(mercaptomethyl)-1,5-dimercapto-3-thiapentane, 4,8-bis(mercaptomethyl)-1,11-dimercapto-3,6,9-trithiaundecane, 4,7-bis(mercaptomethyl)-1,11-dimercapto-3,6,9-trithiaundecane, 5,7-bis(mercaptomethyl)-1,11-dimercapto-3,6,9-trithiaundecane, 1,2,7-trimercapto-4,6-dithiaheptane, 1,2,9-trimercapto-4,6,8-trithianonane, 1,2,8,9-tetramercapto-4,6-dithianonane, 1,2,10,11-tetramercapto-4,6,8-trithiaundecane, 1,2,12,13-tetramercapto-4,6,8,10-tetrathiatridecane, tetrakis(4-mercapto-2-thiaheptyl)methane, tetrakis(7-mercapto-2,5-dithiabutyl)methane, 1,5-dimercapto-3-mercaptomethylthio-2,4-dithiapentane, 3,7-bis(mercaptomethylthio)-1,9-dimercapto-2,4,6,8-tetrathianonane, 2,5-bis(mercaptomethyl)-1,4-dithiane, 2,5-bis(2-mercaptoethyl)-1,4-dithiane, 2,5-bis(mercaptomethyl)-1-thiane, 2,5-bis(2-mercaptoethyl)-1-thiane, bis(4-mercaptophenyl)sulfide, bis(4-mercaptomethylphenyl)sulfide, and 3,4-thiophenedithiol.

Examples of the epoxy compounds include monoepoxy compounds such as ethylene oxide and propylene oxide; phenol-based epoxy compounds produced by condensation of epihalohydrins with polyhydric phenol compounds such as hydroquinone, catechol, resorcin, bisphenol A, bisphenol F, bisphenol ether, halogenated bisphenol A, and a novolak resin; alcohol-based epoxy compounds produced by condensation of epihalohydrins with alcohol compounds such as methanol, ethanol, propanol, butanol, ethylene glycol, diethylene glycol, triethylene glycol, polyethylene glycol, propylene glycol, dipropylene glycol, polypropylene glycol, 1,3-propanediol, 1,4-butanediol, 1,6-hexanediol, neopentyl glycol, glycerin, trimethylolpropane, pentaerythritol, 1,3- and 1,4-cyclohexanediol, 1,3- and 1,4-cyclohexanedimethanol, hydrogenated bisphenol A, bisphenol A-ethylene oxide adducts, and bisphenol A-propylene oxide adducts; urethane-based epoxy compounds produced from the alcohols and the phenol compounds each described above and diisocyanates, glycidyl ester-based epoxy compounds produced by condensation of epihalohydrins with carboxylic acid compounds such as acetic acid, propionic acid, benzoic acid, adipic acid, sebacic acid, dodecanedicarboxylic acid, dimeric acid, phthalic acid, iso- and terephthalic acid, tetrahydrophthalic acid, methyltetrahydrophthalic acid, hexahydrophthalic acid, het acid, nadic acid, maleic acid, succinic acid, fumaric acid, trimellitic acid, benzenetetracarboxylic acid, benzophenonetetracarboxylic acid, naphthalenedicarboxylic acid, diphenyldicarboxylic acid, acrylic acid, and methacrylic acid; amine-based epoxy compounds produced by condensation of epihalohydrins with ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, bis(3-aminopropyl)ether, 1,2-bis(3-aminopropoxy)ethane, 1,3-bis(3-aminopropoxy)-2,2'-dimethylpropane, 1,2-,1,3- or 1,4-bisaminocyclohexane, 1,3- or 1,4-bisaminomethylcyclohexane, 1,3- or 1,4-bisaminoethylcyclohexane, 1,3- or 1,4- bisaminopropylcyclohexane, hydrogenated 4,4'-diaminodiphenylmethane, isophoronediamine, 1,4-bisaminopropylpiperazine, m- or p-phenylenediamine, 2,4- or 2,6-tolylenediamine, m- or p-xylylenediamine, 1,5- or 2,6-naphthalenediamine, 4,4'-diaminodiphenylmethane, 4,4'-diaminodiphenylether, 2,2-(4,4'-diaminodiphenyl)propane, N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,6-diaminohexane, piperazine, 2-methylpiperazine, 2,5- or 2,6-dimethylpiperazine, homopiperazine, 1,1-di-(4-piperidyl)-methane, 1,2-di-(4-piperidyl)-ethane, 1,3-di-(4-piperidyl)-propane, and 1,4-di-(4-piperidyl)-butane; sulfur-containing epoxy compounds such as bis(β-epoxypropyl)sulfide, bis(β-epoxypropyl)disulfide, bis(β-epoxypropyldithio)methane, bis(β-epoxypropylthio)methane, 1,2-bis(β-epoxypropylthio)ethane, 1,3-bis(β-epoxypropylthio)propane, 1,2-bis(β-epoxypropylthio)propane, 1-(β-epoxypropylthio)-2-(β-epoxypropylthiomethyl)propane, 1,4-bis(β-epoxypropylthio)butane, 1,3-bis(β-epoxypropylthio)butane, 1-(β-epoxypropylthio)-3-(β-epoxypropylthiomethyl)butane, 1,5-bis(β-epoxypropylthio)pentane, 1-(β-epoxypropylthio)-4-(β-epoxypropylthiomethyl)pentane, 1,6-bis(β-epoxypropylthio)hexane, 1-(β-epoxypropylthio)-5-(β-epoxypropylthiomethyl)hexane, 1-(β-epoxypropylthio)-2-[(2-β-epoxypropylthioethyl)thio]ethane, 1-(β-epoxypropylthio)-2-[[2-(2-β-epoxypropylthioethyl)thioethyl]thio]ethane, tetrakis(β-epoxypropylthiomethyl)methane, 1,1,1-tris(β-epoxypropylthiomethyl)propane, 1,5-bis(β-epoxypropylthio)-2-(β-epoxypropylthiomethyl)-3-thiapentane, 1,5-bis(β-epoxypropylthio)-2,4-bis(β-epoxypropylthiomethyl)-3-thiapentane, 1-(β-epoxypropylthio)-2,2-bis(β-epoxypropylthiomethyl)-4-thiahexane, 1,5,6-tris(β-epoxypropylthio)-4-(β-epoxypropylthiomethyl)-3-thiahexane, 1,8-bis(β-epoxypropylthio)-4-(β-epoxypropylthiomethyl)-3,6-dithiaoctane, 1,8-bis(β-epoxypropylthio)-4,5-bis(β-epoxypropylthiomethyl)-3,6-dithiaoctane, 1,8-bis(β-epoxypropylthio)-4,4-bis(β-epoxypropylthiomethyl)-3,6-dithiaoctane, 1,8-bis(β-epoxypropylthio)-2,4,5-tris(β-epoxypropylthiomethyl)-3,6-dithiaoctane, 1,8-bis(β-epoxypropylthio)-2,5-bis(β-epoxypropylthiomethyl)-3,6-dithiaoctane, 1,9-bis(β-epoxypropylthio)-5-(β-epoxypropylthiomethyl)-5-[(2-β-epoxypropylthioethyl)thiomethyl]-3,7-dithianonane, 1,10-bis(β-epoxypropylthio)-5,6-bis[(2-β-epoxypropylthioethyl)thio]-3,6,9-trithiadecane, 1,11-bis(β-epoxypropylthio)-4,8-bis(β-epoxypropylthiomethyl)-3,6,9-trithiaundecane, 1,11-bis(β-epoxypropylthio)-5,7-bis(β-epoxypropylthiomethyl)-3,6,9-trithiaundecane, 1,11-bis(β-epoxypropylthio)-5,7-[(2-β-epoxypropylthioethyl)thiomethyl]-3,6,9-trithiaundecane, 1,11-bis(β-epoxypropylthio)-4,7-bis(β-epoxypropylthiomethyl)-3,6,9-trithiaundecane, 1,3- and 1,4-bis(β-epoxypropylthio)cyclohexane, 1,3- and 1,4-bis(β-epoxypropylthiomethyl)cyclohexane, bis[4-(β-epoxypropylthio)cyclohexyl]methane, 2,2-bis[4-(β-epoxypropylthio)cyclohexyl]propane, bis[4-(β-epoxypropylthio)cyclohexyl]sulfide, 2,5-bis(β-epoxypropylthiomethyl)-1,4-dithiane, 2,5-bis(β-epoxypropylthioethylthiomethyl)-1,4-dithiane, 1,3- and 1,4-bis(β-epoxypropylthio)benzene, 1,3- and 1,4-bis(β-epoxypropylthiomethyl)benzene, bis[4-(β-epoxypropylthio)phenyl]methane, 2,2-bis[4-(β-epoxypropylthio)phenyl]propane, bis[4-(β-epoxypropylthio)phenyl]sulfide, bis[4-(β-epoxypropylthio)phenyl]sulfone, and 4,4'-bis(β-epoxypropylthio)biphenyl; alicyclic epoxy compounds such as 3,4-epoxycyclohexyl-3,4-epoxycyclohexane carboxylate, vinylcyclohexane dioxide, 2-(3,4-epoxycyclohexyl)-5,5-spiro-3,4-epoxycyclohexane-meta-dioxane, and bis(3,4-epoxycyclohexyl)adipate, epoxy compounds produced by epoxidizing unsaturated compounds, such as cyclopentadiene epoxide, epoxidized soybean oil, epoxidized polybutadiene, and vinylcyclohexene epoxide; and epoxy compounds having an unsaturated group such as vinylphenyl glycidyl ether, vinylbenzyl glycidyl ether, glycidyl methacrylate, glycidyl acrylate, and allyl glycidyl ether.

Examples of the isocyanates include monoisocyanates such as methylisocyanate, ethylisocyanate, propylisocyanate, iso-propylisocyanate, n-butylisocyanate, sec-butylisocyanate, tert-butylisocyanate, pentylisocyanate, hexylisocyanate, octylisocyanate, dodecylisocyanate, cyclohexylisocyanate, phenylisocyanate, and toluylisocyanate; and polyisocyanates such as diethylenediisocyanate, tetramethylenediisocyanate, hexamethylenediisocyanate, trimethylhexamethylenediisocyanate, cyclohexanediisocyanate, 1,3-bis(isocyanatomethyl)cyclohexane, 1,4-bis(isocyanatomethyl)cyclohexane, isophorone diisocyanate, 2,5-bis(isocyanatomethyl)norborene, 2,6-bis(isocyanatomethyl)decahydronaphthalene, 2,5-diisocyanato-1,4-dithiane, 2,5-bis(isocyanatomethyl)-1,4-dithiane, 2,6-bis(isocyanatomethyl)-1,4-dithiane, lysinetriisocyanate, 2,4-tolylenediisocyanate, 6-tolylenediisocyanate, o-tolidinediisocyanate, 4,4'-diphenylmetanediisocyanate, diphenyletherdiisocyanate, 3-(2'-isocyanatocyclohexyl)propylisocyanate, tris(phenylisocyanate) thiophosphate, isopropylidenebis(cyclohexylisocyanate), 2,2'-bis(4-isocyanatophenyl)propane, triphenylmetanetriisocyanate, bis(diisocyanatotolyl)phenylmethane, 4,4',4"-triisocyanato-2,5-dimethoxyphenylamine, 3,3'-dimethoxybenzidine-4,4'-diisocyanate, 1,3-phenylenediisocyanate, 1,4-phenylenediisocyanate, 4,4'-diisocyanatobiphenyl, 4,4'-diisocyanato-3,3'-dimethylbiphenyl, dicyclohexylmethane-4,4'-diisocyanate, 1,1'-methylenebis(4-isocyanatobenzene), 1,1'-methylenebis(3-methyl-4-isocyanatobenzene), m-xylylenediisocyanate, p-xylylenediisocyanate, 1,3-bis(1-isocyanato-1-methylethyl)benzene, 1,4-bis(1-isocyanato-1-methylethyl)benzene, 1,3-bis(2-isocyanato-2-propyl)benzene, 2,6-bis(isocyanatomethyl)naphthalene, 1,5-naphthalenediisocyanate, bis(isocyanatomethyl)tetrahydrodicyclopendadiene, bis(isocyanatomethyl)dicyclopendadiene, bis(isocyanatomethyl)tetrahydrothiophene, bis(isocyanatomethyl)thiophene, 2,5-diisocyanatomethylnorbornene, bis(isocyanatomethyl)adamantane, 3,4-diisocyanatoselenophane, 2,6-diisocyanato-9-selenabicyclononane, bis(isocyanatomethyl)selenophane, 3,4-diisocyanato-2,5-diselenolane, dimmer acid diisocyanate, and 1,3,5-tri(1-isocyanatohexyl)isocyanurate; and dimmers obtained by buret type reaction of these polyisocyanates, cyclized trimers of these polyisocyanates, and addition products of these polyisocyanates and alcohols or thiols.

Further, examples of the isothiocyanates include compounds obtained by substituting all or part of the isocyanate groups of the foregoing compounds having at least one isocyanate group in a molecule with an isothiocyanate group. Examples of carboxylic acids include those described in the section of the epoxy compounds and which were given as the examples of the object raw material reacted with epihalohydrins.

Examples of carboxylic anhydrides include those described in the section of the epoxy compounds and which were given as examples of the object raw material reacted with epihalohydrins.

Examples of phenols include those described in the section of the epoxy compounds which were given as examples of the object raw material reacted with epihalohydrins.

Examples of amines include those described in the section of the epoxy compounds and which were given as examples of the object raw material reacted with epihalohydrins.

Examples of vinyl compounds include vinyl ether, ethyl vinyl ether, isobutyl vinyl ether, 2-ethylhexyl vinyl ether, phenyl vinyl ether, benzyl vinyl ether, 2-chloroethyl vinyl ether, cyclohexyl vinyl ether, vinyl glycidyl ether, vinyl alcohol, methyl vinyl carbinol, ethylene glycol monovinyl ether, ethylene glycol divinyl ether, diethylene glycol monovinyl ether, diethylene glycol divinyl ether, tetramethylene glycol monovinyl ether, divinyl sulfide, vinyl ethyl sulfide, vinyl phenyl sulfide, methyl vinyl ketone, divinyl dicarbonate, vinyl diglycol carbonate, vinylene carbonate, vinyl acetate, vinyl chloroacetate, vinyl propionate, vinyl butyrate, vinyl hexanoate, vinyl 2-ethylhexanoate, divinyl adipate, vinyl benzoate, vinyl salicylate, vinyl acrylate, vinyl methacrylate, vinyl bromide, vinyl iodide, vinyl phosphate, vinylurea, styrene, 2-methylstyrene, 3-methylstyrene, 4-methylstyrene, α-methylstyrene, 2,4-6-trimethylstyrene, 4-tert-butylstyrene, stilbene, vinylphenol, 3-vinylbenzyl alcohol, 4-vinylbenzyl alcohol, 2-(4-vinylphenylthio)ethanol, 2-(3-vinylphenylthio)ethanol, 2-(4-vinylbenzylthio)ethanol, 2-(3-vinylbenzylthio)ethanol, 1,3-bis(4-vinylbenzylthio)-2-propanol, 1,3-bis(3-vinylbenzylthio)-2-propanol, 2,3-bis(4-vinylbenzylthio)-1-propanol, 2,3-bis(3-vinylbenzylthio)-1-propanol, cinnamyl alcohol, cinnamaldehyde, 1,3-divinylbenzene, 1,4-divinylbenzene, trivinylbenzene, divinylphthalate, 2-chlorostyrene, 3-chlorostyrene, 4-chlorostyrene, 3-chloromethylstyrene, 4-chloromethylstyrene, 4-aminostyrene, 3-cyanomethylstyrene, 4-cyanomethylstyrene, 4-vinylbiphenyl, 2,2'-divinylbiphenyl, 4,4'-divinylbiphenyl, 2,2'-distyryl ether, 4,4'-distyryl ether, 2,2'-distyryl sulfide, 4,4'-distyryl sulfide, 2,2-bis(4-vinylphenyl)propane, bis(4-vinylphenyl)ether, and 2,2-bis(4-vinyloxyphenyl)propane.

Examples of allyl compounds include compounds obtained by substituting all or part of the vinyl groups of the compounds given as examples of the vinyl compounds with an allyl group.

Examples of acryl compounds include methyl acrylate, ethyl acrylate, propyl acrylate, butyl acrylate, cyclohexyl acrylate, 2-hydroxyethyl acrylate, 3-hydroxypropyl acrylate, 2-hydroxypropyl acrylate, 3-phenoxy-2-hydroxypropyl acrylate, trimethylolpropane monoacrylate, 2-hydroxyethyl isocyanurate monoacrylate, 2-hydroxyethyl isocyanurate diacrylate, 2-hydroxyethyl cyanurate monoacrylate, 2-hydroxyethyl cyanurate diacrylate, ethylene glycol diacrylate, diethylene glycol diacrylate, 1,3-butylene glycol diacrylate, triethylene glycol diacrylate, polyethylene glycol diacrylate, propylene glycol diacrylate, 1,3-propanediol diacrylate, 1,3-butanediol diacrylate, 1,4-butanediol diacrylate, 1,6-hexanediol diacrylate, neopentyl glycol diacrylate, polypropylene glycol diacrylate, 2-hydroxy-1,3-diacryloxypropane, 2,2-bis[4-(acryloxyethoxy)phenyl]propane, 2,2-bis[4-(acryloxyethoxy)cyclohexyl]propane, 2,2-bis[4-(2-hydroxy-3-acryloxypropoxy)phenyl]propane, 2,2-bis[4-(acryloxy-diethoxy)phenyl]propane, 2,2-bis[4-(acryloxy-polyethoxy)phenyl]propane, trimethylolpropane triacrylate, pentaerythritol monoacrylate, pentaerythritol diacrylate pentaerythritol triacrylate, pentaerythritol tetraacrylate, pentaacrylate of bis(2,2,2-trimethylolethyl)ether, hexaacrylate of bis(2,2,2-trimethylolethyl)ether, and bis(4-acryloylthiophenyl)sulfide.

Examples of methacryl compounds include compounds obtained by substituting all or part of the acryl groups of the compounds given as examples of the acryl compounds with a methacryl group.

It should be understood that various known additives such as an antioxidant, bluing agent, ultraviolet absorbent, deodorant and the like may be added to further improve the utility of the obtained material.

Arrangement of Manufacturing Apparatus

Next, a manufacturing apparatus for manufacturing the optical material of the invention will be described below.

FIG. 1 is a schematic illustration of the manufacturing apparatus of optical material according to an exemplary embodiment of the invention.

As shown in FIG. 1, a manufacturing apparatus 100 includes: a tank 110 for storing a resin material; a viscometer 120 for measuring a viscosity of a reacting composition generated by a reaction of the resin material within the tank 110; a mold 130 for polymerizing and curing the reacting composition; a material feeder 140 for feeding the reacting composition from the tank 110 into the mold 130; and a controller 150 for controlling the supply of the reacting composition and the progress of the reaction.

The tank 110 is a substantially cylindrical container having a bottom side 111 and a wall 112 vertically erected from the bottom side 111. An attachment hole 113 for attaching the viscometer 120 is provided on a part of the wall 112 adjacent to the bottom side 111.

The viscometer 120 includes a body 121 fitted into the attachment hole 113, a detector 122 provided on an end of the body 121 for detecting the viscosity of the reacting composition and a display device 123 for displaying a measured value of the detector 122. An interspace between the body 121 and the attachment hole 113 are sealed so that the material inside the tank 110 is not leaked to the outside. The detector 122 is immersed in the reacting composition (or material) in the tank 110. The display device 123 is connected to the body 121 to display the viscosity detected by the detector 122 after numeric conversion.

Commercially available viscometer may be suitably used as the viscometer 120. For instance, an in-line viscometer such as a shielded viscometer "FVM80A-ST" (trade name) manufactured by CBC Co. Ltd. can be suitably used.

The mold 130 is provided by a pair of lens molds 131 and a tape 132 wound around a periphery of the lens molds 131.

The material feeder 140 includes a dispenser 141 for injecting the reacting composition into the mold 130 and a material supply tube 142 of which a first end is connected to a base end of the dispenser 141. A second end of the material supply tube 142 is immersed in the reacting composition in the tank 110. The dispenser 141 includes a body section 1411 for adjusting the injection of the reacting composition and a nozzle 1412 for discharging the reacting composition.

The controller 150 includes a first control unit 151 for controlling a process for injecting the reacting composition into the mold 130 and a second control unit 152 for controlling the progress of the reaction in accordance with the viscosity of the reacting composition in the tank 110.

The first control unit 151 regulates an injection amount of the reacting composition from the dispenser 141 and the flow rate of the reacting composition circulating in the material supply tube 142, and detects that the reacting composition is injected into the mold 130 at a predetermined level.

The second controller 152 determines whether the next processing is to be conducted or not based on a value measured by the viscometer 120.

Manufacturing Method of Optical Material

Next, a manufacturing method of the optical material by the manufacturing apparatus 100 will be described below.

FIG. 2 is a flowchart of a manufacturing process of the optical material according to the exemplary embodiment of the invention.

As shown in FIG. 2, the material is initially loaded into the tank 110 (step S1). The examples of the material are sulfur (the compound (a)), bis(β-epithiopropyl)sulfide (the compound (b)) and benzylmercaptan (the compound (c)).

Relative to a total amount of the mixture of the compound (a) and the compound (b), 20 parts by mass of the compound (a), 80 parts by mass of the compound (b) and 5 parts by mass of the compound (c) are blended.

Incidentally, the preliminary polymerization catalyst may be added at this time.

Then, the material loaded into the tank 110 is stirred while being heated (step S2).

More specifically, the compound (a) and the compound (b) are stirred to conduct a preliminary reaction step (step S3) for 1 minute to 72 hours to prepare a reacting composition.

Incidentally, preferable range of the reaction time is 10 minutes to 48 hours, which is more preferably 30 minutes to 24 hours. Further, preferable range of the reaction temperature is 10 degrees Celsius or higher and 120 degrees Celsius or lower, which is more preferably 20 degrees Celsius or higher and 100 degrees Celsius or lower.

It is preferable that 10% or more, more preferably 20% or more of the compound (a) (100% before reaction) is reacted during the step S3. The reaction may be conducted under any environment, e.g. under the atmosphere, under the presence of gas such as nitrogen and oxygen, under sealed condition of normal pressure, under pressurized/depressurized sealed condition, and under depressurized condition.

The compound (c) and the various additives are added during the step S3.

The viscosity of the reacting composition can be always measured by the viscometer 120 immersed in the reacting composition (or material) in the tank 110. Accordingly, the second control unit 152 monitors the viscosity displayed on the display device 123 (step S4) and continues the step S3 until the viscosity reaches to a predetermined value. In the preliminary reaction step of this embodiment, the predetermined viscosity is 50 mPa·s.

On the other hand, when the viscosity displayed on the display device 123 reaches to the predetermined viscosity, the second control unit 152 terminates the step S3 to conduct the subsequent cooling step (step S5).

In the step S5, the second control unit 152 monitors the viscosity displayed on the display device 123 (step S6) and continues the step S5 until the viscosity reaches to a predetermined value. As described above, the material is cooled to, for instance, 20 degrees Celsius until the viscosity of the material reaches to the predetermined value. In the cooling step of this embodiment, the predetermined viscosity is 170 mPa·s.

On the other hand, when the viscosity displayed on the display device 123 reaches to the predetermined viscosity, the second control unit 152 terminates the step S5.

Then, after adding 2-mercapto-1-methylimidazole as the polymerization catalyst (step S7), deaerating process is conducted (step S8).

It is preferable to apply the deaerating process on the reacting composition in order to apply high transparency on the optical material. The deaerating condition is a depressurized environment of 0.001 to 50 torr for 1 minute to 24 hours under the temperature of 0 to 100 degrees Celsius. During the deaerating process, it is preferable that the surface of the reacting composition is renewed by stirring, blowing a gas and vibrating with ultrasound for the purpose of enhancing the deaeration effect. By the deaerating process, dissolved gas such as hydrogen sulfide, low-boiling substances such as low-molecular-weight mercaptan and the like are removed.

In the step S8, the second control unit 152 monitors the viscosity displayed on the display device 123 (step S9) and continues the step S8 until the viscosity reaches to a predetermined value. In the deaerating process of this embodiment, the predetermined viscosity is 90 mPa·s.

On the other hand, when the viscosity displayed on the display device 123 reaches to the predetermined viscosity, the second control unit 152 terminates the step S8.

Then, the composition in the tank 110 is transferred by the material feeder 140 and the composition is injected into the mold 130 by the dispenser 141 (step S10).

The above-described exemplary embodiment offers the following advantages.

(1) In this exemplary embodiment, the viscosity of the reacting composition in the tank 110 is measured in the preliminary reaction step, the cooling step and the deaeration step in the manufacturing process of the optical material and the progress of the respective steps is controlled in accordance with the viscosity.

Since the respective steps are conducted until the viscosity reaches the predetermined value, the preliminary reaction, cooling and deaeration can be fully conducted. Accordingly, the subsequent polymerization reaction in the mold can be more reliably conducted and products with higher quality can be produced.

(2) Since the progress is managed in accordance with the viscosity in the respective steps, the viscosity of the reacting composition can be brought closer to the most proper viscosity for being injected into the mold. Consequently, since the reacting composition can be smoothly injected into the mold, mass production can be facilitated.

(3) In the exemplary embodiment, the viscometer 120 is attached to the tank 110 and the detector 122 is constantly immersed in the reacting composition (or material) within the tank 110. Further, the measured value is displayed on the display device 123. Accordingly, the viscosity of the reacting composition in the tank 110 can be constantly measured and monitored.

Thus, it is not necessary to take a part of the reacting composition out of the tank 110 to measure the viscosity in order to measure the viscosity of the reacting composition in the tank 110. When the viscosity of the reacting composition is measured after taking the reacting composition out of the tank 110, an error may be caused. However, accurate viscosity of the reacting composition in the tank 110 can be measured. As a result, the viscosity of the reacting composition can be brought closer to the most appropriate viscosity for being injected into the mold and a product with high quality can be manufactured.

With the use of the manufacturing apparatus, the above progress control can be conducted.

Incidentally, it should be understood that the scope of the invention is not limited to the above exemplary embodiment, but includes modification and improvements as long as an object and advantage of the invention can be attained.

For instance, though only the viscometer 120 is attached to the tank 110, a refractometer may be additionally attached to the tank 110. Accordingly, both of the viscosity and refractive index can be monitored, thus allowing production of mass-producible and high quality products.

EXAMPLE

The advantage(s) of the invention will be described below with reference to Examples, however, the scope of the invention is by no means limited to the Examples.

Example 1

In a reaction container attached with an in-line viscometer ("FVM80A-ST" manufactured by CBC Co. Ltd.), 20 parts by mass of sulfur and 80 parts by mass of bis(β-epithiopropyl) sulfide were sufficiently mixed at 65 degrees Celsius to obtain a uniform mixture.

Subsequently, after adding 0.5 parts by mass of 2-mercapto-1-methylimidazole, the mixture was subjected to a reaction at 60 degrees Celsius for approximately 60 minutes (preliminary reaction step). The viscosity (converted value at 30 degrees Celsius) measured by the in-line viscometer at this time was 50 mPa·s.

Then, the obtained resin composition was cooled to 20 degrees Celsius (cooling step). The viscosity (converted value at 30 degrees Celsius) measured at this time was 170 mPa·s.

On the other hand, 5 parts by mass of benzyl mercaptan, 0.03 parts by mass of triethyl benzyl ammonium chloride and 0.2 parts by mass of di-n-buthyl-tin-dichloride were added and were sufficiently mixed to be uniform, thus obtaining an A solution.

The A solution was added to the cooled resin composition to obtain a uniform resin composition.

Subsequently, the obtained resin composition was subjected to a deaerating process under an environment of 10 torr and 20 degrees Celsius for 10 minutes (deaeration step). The viscosity (converted value at 30 degrees Celsius) measured by the in-line viscometer at this time was 90 mPa·s.

Subsequently, the composition was injected into a mold using two mirror-finished glass flat plates held by an adhesive tape, of which temperature was raised from 30 degrees Celsius to 100 degrees Celsius in 20 hours to polymerize and cure the composition. After self-cooling the material to a room temperature, the material was removed from the mold to obtain a cured optical material.

Example 2

The same material as Example 1 was used and was preliminarily reacted at 55 degrees Celsius (preliminary reaction step). At this time, it took approximately 240 minutes to reach the same viscosity (50 mPa·s) as the viscosity at the completion of the preliminary reaction in Example 1.

Subsequently, the cooling step, the deaeration step and the polymerization curing step were conducted in the same manner as Example 1 to obtain an optical material. Incidentally, the viscosity after the cooling step (converted value at 30 degrees Celsius) was 170 mPa·s and the viscosity after the deaeration step (converted value at 30 degrees Celsius) was 90 mPa·s.

Example 3

The same material as Example 1 was used and was preliminarily reacted at 65 degrees Celsius (preliminary reaction step). At this time, it took approximately 30 minutes to reach the same viscosity (50 mPa·s) as the viscosity at the completion of the preliminary reaction in Example 1.

Subsequently, the cooling step, the deaeration step and the polymerization curing step were conducted in the same manner as Example 1 to obtain an optical material. Incidentally, the viscosity after the cooling step (converted value at 30 degrees Celsius) was 170 mPa·s and the viscosity after the deaeration step (converted value at 30 degrees Celsius) was 90 mPa·s.

Comparison 1

The same material as Example 1 was used and was preliminarily reacted at 60 degrees Celsius (preliminary reaction step). The viscosity (converted value at 30 degrees Celsius) of sampled reaction product measured by a rotary viscometer at this time was 60 mPa·s.

Subsequently, the cooling step, the deaeration step and the polymerization curing step were conducted in the same manner as Example 1 to obtain an optical material. Incidentally, the viscosity after the cooling step (converted value at 30 degrees Celsius) was 200 mPa·s and the viscosity after the deaeration step (converted value at 30 degrees Celsius) was 120 mPa·s.

The composition injected into the mold was heated from 30 degrees Celsius to 100 degrees Celsius in 20 hours to polymerize and cure the composition. After self-cooling the material to a room temperature, the material was removed from the mold to obtain a cured optical material.

Incidentally, it took about 7 minutes to leak vacuum in a reaction container, sample the reaction product, measure the viscosity and evacuate the container. Further, it took about 2 minutes to clean the inside of the viscometer after measurement in order to conduct the next measurement.

Comparison 2

The same material as in Comparison 1 was used and was preliminarily reacted at 55 degrees Celsius (preliminary reaction step). The reaction product at this time was sampled and was measured by a rotary viscometer. It took approximately 240 minutes to reach the same viscosity (60 mPa·s) as the viscosity at the completion of the preliminary reaction in Comparison 1.

Subsequently, the cooling step, the deaeration step and the polymerization curing step were conducted in the same manner as Comparison 1 to obtain an optical material. Incidentally, the viscosity after the cooling step (converted value at 30 degrees Celsius) was 200 mPa·s and the viscosity after the deaeration step (converted value at 30 degrees Celsius) was 120 mPa·s.

The composition injected into the mold was heated from 30 degrees Celsius to 100 degrees Celsius in 20 hours to polymerize and cure the composition. After self-cooling the material to a room temperature, the material was removed from the mold to obtain a cured optical material.

Incidentally, it took the same time as in Comparison 1 for sampling and cleaning the inside of the viscometer.

Comparison 3

The same material as in Comparison 1 was used and was preliminarily reacted at 65 degrees Celsius (preliminary reaction step). The reaction product at this time was sampled and was measured by a rotary viscometer. It took approximately 30 minutes to reach the same viscosity (60 mPa·s) as the viscosity at the completion of the preliminary reaction in Comparison 1.

Subsequently, the cooling step, the deaeration step and the polymerization curing step were conducted in the same manner as Comparison 1 to obtain an optical material. Incidentally, the viscosity after the cooling step (converted value at 30 degrees Celsius) was 300 mPa·s and the viscosity after the deaeration step (converted value at 30 degrees Celsius) was 220 mPa·s.

The composition injected into the mold was heated from 30 degrees Celsius to 100 degrees Celsius in 20 hours to polymerize and cure the composition. After self-cooling the material to a room temperature, the material was removed from the mold to obtain a cured optical material.

Incidentally, it took the same time as in Comparison 1 for sampling and cleaning the inside of the viscometer.

The preliminary reaction condition, viscosity and results of injection in the respective Examples and Comparisons are shown in the following Table 1.

The judgment standard of the results of injection is as follows:

Judgment Standard of Injection Results

A: Injectable without problem
B: Difficult to inject
C: Unable to inject

TABLE 1

| | Condition of Preliminary Reaction Step | | Measured Viscosity (mPa·s) | | | |
|---|---|---|---|---|---|---|
| | Temperature (°C.) | Time | After Preliminary Reaction Step | After Cooling Step | After Deaeration Step | Injection Results |
| Example 1 | 60 | About 60 min. | 50 | 170 | 90 | A |
| Example 2 | 55 | About 240 min. | 50 | 170 | 90 | A |
| Example 3 | 65 | About 30 min. | 50 | 170 | 90 | A |
| Comparison 1 | 60 | About 60 min. | 60 | 200 | 120 | B |
| Comparison 2 | 55 | About 240 min. | 60 | 200 | 120 | B |
| Comparison 3 | 65 | About 30 min. | 60 | 300 | 220 | C |

As can be seen in Table 1, since the preliminary reaction was conducted until the viscosity becomes 50 mPa·s in Examples 1 to 3 even when the condition of the preliminary reaction step was changed, the most appropriate level of viscosity was given to the reacting composition after the deaeration step, thus allowing smooth injection of the composition.

On the other hand, since the viscosity of the reacting composition in Comparisons 1 and 2 was high when being injected into the mold and was difficult to inject the composition, it took approximately twice as long injection time as Examples 1 to 3. Further, the viscosity of the composition in Comparison 3 was too high to be injected.

As described above, since the progress of reaction was controlled in accordance with the viscosity in Examples 1 to 3, the reacting composition could be efficiently injected into the mold and was shown to be well adapted for mass production.

The invention is applicable to optical goods including a plastic lens such as a spectacle lens, prism, optical fiber, information-recording substrate and filter, and further to an adhesive.

What is claimed is:

1. A manufacturing method of an optical material, the method comprising:

blending an inorganic compound (a) containing at least one of a sulfur atom and a selenium atom and a compound (b) represented by a following formula (I) in a tank, the compound (a) and the compound (b) being blended at a ratio of 1 mass % or more and 50 mass % or less of the compound (a) and 50 mass % or more and 99 mass % or less of the compound (b) relative to a total mass of a mixture of the compound (a) and the compound (b);

mixing a compound (c) containing at least one thiol (SH) group;

preliminarily polymerizing at least the compound (a) and the compound (b) by blending and polymerizing the compounds in the tank;

cooling the compounds; and deaerating the compounds, wherein the compound (c) is mixed during any one of the preliminary polymerizing, the cooling and the deaerating, a viscosity of the obtained composition is measured during at least one of the preliminarily polymerizing, the cooling and the deaerating, and when the viscosity reaches a predetermined value, a control is performed to terminate an ongoing one of the preliminarily polymerizing, the cooling and the deaerating and start a succeeding one of the preliminarily polymerizing, the cooling and the deaerating, when the control is performed during the preliminarily polymerizing, the control is performed so that the viscosity is kept at or lower than the predetermined value, and when the control is performed during the cooling after the control is performed in the preliminarily polymerizing, the cooling is terminated when the viscosity reaches a second predetermined value that is larger than the predetermined value

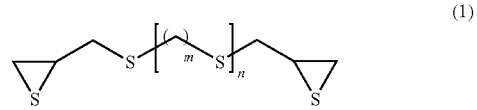

(1)

(m represents an integer of 0 to 4, and n represents an integer of 0 to 2).

2. The manufacturing method of optical material according to claim 1, wherein the control is performed in both the preliminarily polymerizing and the cooling.

* * * * *